United States Patent
Takeda et al.

(10) Patent No.: US 11,888,570 B2
(45) Date of Patent: Jan. 30, 2024

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Hiroki Harada, Tokyo (JP); Kazuki Takeda, Tokyo (JP); Satoshi Nagata, Tokyo (JP); Yuichi Kakishima, Palo Alto, CA (US); Chongning Na, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/495,505

(22) PCT Filed: Mar. 23, 2017

(86) PCT No.: PCT/JP2017/011897
§ 371 (c)(1),
(2) Date: Sep. 19, 2019

(87) PCT Pub. No.: WO2018/173238
PCT Pub. Date: Sep. 27, 2018

(65) Prior Publication Data
US 2020/0014453 A1 Jan. 9, 2020

(51) Int. Cl.
*H04B 7/06* (2006.01)
*H04W 74/08* (2009.01)
(Continued)

(52) U.S. Cl.
CPC ......... *H04B 7/0695* (2013.01); *H04L 1/0026* (2013.01); *H04L 5/0051* (2013.01);
(Continued)

(58) Field of Classification Search
CPC ..... H04B 7/0695; H04B 7/088; H04L 1/0026; H04L 5/0051; H04L 5/10; H04L 5/0053; H04W 56/001; H04W 74/0833
See application file for complete search history.

(56) References Cited

U.S. PATENT DOCUMENTS

| 2013/0039345 A1 | 2/2013 | Kim et al. |
| 2013/0083739 A1 | 4/2013 | Yamada |

(Continued)

FOREIGN PATENT DOCUMENTS

| JP | 2014-526217 A | 10/2014 |
| WO | 2014/054904 A1 | 4/2014 |

(Continued)

OTHER PUBLICATIONS

Office Action issued in the counterpart Japanese Patent Application No. 2019-506871, dated Jun. 23, 2020 (8 pages).
(Continued)

*Primary Examiner* — John D Blanton
(74) *Attorney, Agent, or Firm* — Osha Bergman Watanabe & Burton LLP

(57) ABSTRACT

A terminal is disclosed including a transmitter that transmits a beam recovery request signal and a processor that controls the transmission of the beam recovery request signal. The transmission of the beam recovery request signal is controlled by the processor based on a received power that is measured using a channel state information reference signal (CSI-RS) resource or a synchronization signal (SS) block that is quasi co-located (QCL) with a demodulation reference signal of a downlink control channel. In other aspects, a radio communication method is also disclosed.

5 Claims, 13 Drawing Sheets

(51) Int. Cl.
  *H04L 5/10* (2006.01)
  *H04L 1/00* (2006.01)
  *H04L 5/00* (2006.01)
  *H04W 56/00* (2009.01)
(52) U.S. Cl.
  CPC ............ *H04L 5/10* (2013.01); *H04W 56/001* (2013.01); *H04W 74/0833* (2013.01)

(56) References Cited

U.S. PATENT DOCUMENTS

| | | | |
|---|---|---|---|
| 2015/0223208 | A1 | 8/2015 | Park et al. |
| 2016/0219557 | A1* | 7/2016 | He .................. H04L 5/0091 |
| 2018/0092139 | A1* | 3/2018 | Novlan ............... H04W 8/005 |
| 2018/0205585 | A1* | 7/2018 | Sadiq .................. H04B 7/088 |
| 2018/0206170 | A1* | 7/2018 | Nagaraja ............ H04W 16/28 |
| 2018/0234960 | A1* | 8/2018 | Nagaraja ........... H04W 36/0055 |
| 2018/0278467 | A1* | 9/2018 | John Wilson ........ H04W 72/21 |
| 2019/0190672 | A1 | 6/2019 | Kim et al. |
| 2019/0191434 | A1* | 6/2019 | Hugl .................. H04L 5/0053 |
| 2019/0222279 | A1* | 7/2019 | Xi .................... H04B 7/0617 |
| 2019/0230714 | A1* | 7/2019 | Liu .................... H04W 76/19 |
| 2019/0327710 | A1* | 10/2019 | Liu .................... H04W 68/04 |
| 2020/0119839 | A1* | 4/2020 | Jo ...................... H04L 1/0047 |
| 2020/0204224 | A1* | 6/2020 | Kang ................. H04L 5/0094 |
| 2020/0314908 | A1* | 10/2020 | Hwang ............. H04W 74/0833 |
| 2022/0240248 | A1* | 7/2022 | Mochizuki .......... H04W 72/02 |

FOREIGN PATENT DOCUMENTS

| | | |
|---|---|---|
| WO | 2016/033978 A1 | 3/2016 |
| WO | 2018/030849 A1 | 2/2018 |

OTHER PUBLICATIONS

Office Action issued in the counterpart Russian Patent Application No. 2019131693/07(062244), dated Jul. 13, 2020 (8 pages).
NTT Docomo, Inc.; "Views on mechanism to recover from beam failure"; 3GPP TSG RAN WG1 Meeting #88, R1-1702799; Athens, Greece; Feb. 13-17, 2017 (4 pages).
International Search Report issued in PCT/JP2017/011897 dated Jun. 13, 2017 (2 pages).
Written Opinion of the International Searching Authority issued in PCT/JP2017/011897 dated Jun. 13, 2017 (4 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Office Action in counterpart Egyptian Patent Application No. 2019091487 dated Oct. 19, 2020 (7 pages).
Extended European Search Report issued in counterpart European Patent Application No. 17902397.3, dated Oct. 27, 2020 (13 pages).
Nokia, Alcatel-Lucent Shanghai Bell; "Beam Management—Beam Reporting"; 3GPP TSG-RAN WG1#88, R1-1703162; Athens, Greece; Feb. 13-17, 2017 (5 pages).
Vivo; "Discussion on beam recovery"; 3GPP TSG RAN WG1 Meeting #88, R1-1703389; Athens, Greece; Feb. 13-17, 2017 (4 pages).
Ericsson; "Beam management overview"; 3GPP TSG-RAN WG1 #87, R1-1612345; Reno, Nevada; Nov. 14-18, 2016 (6 pages).
Office Action issued in Chinese Application No. 201780088829.3; dated Jun. 28, 2021 (12 pages).
Office Action issued in the counterpart Indian Patent Application No. 201937040105, dated Sep. 10, 2021 (8 pages).
Office Action issued in the counterpart European Patent Application No. 17902397.3, dated Feb. 3, 2022 (10 pages).
Notice of Final Rejection issued in Korean Application No. 10-2019-7029561, dated Mar. 14, 2022 (8 pages).
Office Action issued in Chinese Application No. 201780088829.3, dated Jan. 13, 2022 (14 pages).
Office Action issued in counterpart Korean Application No. 10-2019-7029561 dated Jul. 29, 2021 (8 pages).
Office Action issued in the counterpart European Patent Application No. 17902397.3, dated Aug. 3, 2021 (11 pages).
ZTE, ZTE Microelectronics; "Beam related indication for DL and UL beam management"; 3GPP TSG RAN WG1 NR Ad-Hoc Meeting, R1-1700123; Spokane, USA; Jan. 16-20, 2017 (7 pages).
Oral Proceedings issued in European Application No. 17902397.3 dated Aug. 9, 2022 (11 pages).
Office Action in counterpart Korean Patent Application No. 10-2019-7029561 dated Jul. 1, 2022 (8 pages).
H. Huawei et al; "WF on Mechanism to Recover from Beam Failure"; 3GPP TSG RAN WG1 #88, R1-1703988; Athens, Greece; Feb. 13-17, 2017 (3 pages).
Nokia et al; "Multi-beam control channel transmission"; 3GPP TSG RAN WG1 NR Ad-Hoc Meeting, R1-1701093; Spokane, USA; Jan. 16-20, 2017 (5 pages).
H. Huawei; "Discussion on link recovery procedure for beam blockage"; 3GPP TSG RAN WG1 NR Ad Hoc Meeting, R1-1700041; Spokane, USA; Jan. 16-20, 2017 (5 pages).
Office Action issued in counterpart Egyptian Patent Application No. 2019091487 dated May 22, 2023 (9 pages).
Office Action issued in counterpart Korean Application No. 10-2019-7029561 dated Feb. 23, 2023 (8 pages).
Office Action issued in the counterpart European Patent Application No. 17902397.3, dated Feb. 17, 2023 (16 pages).

* cited by examiner

Tx BEAM B21 → CSI RESOURCE #0
Tx BEAM B22 → CSI RESOURCE #1 ... SECOND BEST Tx BEAM
Tx BEAM B23 → CSI RESOURCE #2 ... BEST Tx BEAM
Tx BEAM B24 → CSI RESOURCE #3

Tx BEAM B23 (Rx BEAM b3) ← CSI RESOURCE #2 ← DMRS PORT #0
Tx BEAM B22 (Rx BEAM b2) ← CSI RESOURCE #1 ← DMRS PORT #1

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of LTE (Long Term Evolution) have been drafted for the purpose of further increasing high speed data rates, providing lower latency and so on (see non-patent literature 1). In addition, the specifications of LTE-A (also referred to as "LTE-Advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th Generation mobile communication system)," "NR (New Radio)," "NX (New radio access)," "FX (Future generation radio access)," "LTE Rel. 14," "LTE Rel. 15" and/or later versions) are also under study.

In LTE Rel. 10/11, CA (Carrier Aggregation) to integrate multiple CCs (Component Carriers) is introduced in order to achieve broadbandization. Each CC is formed using the system bandwidth of LTE Rel. 8 as one unit. In addition, in CA, multiple CCs under the same radio base station (also referred to as "eNB (eNodeB)") are configured in a user terminal (also referred to as "UE (User Equipment)").

Meanwhile, in LTE Rel. 12, DC (Dual Connectivity), in which multiple CGs (Cell Groups) formed by different radio base stations are configured in UE, is also introduced. Each cell group is comprised of at least one cell (or CC). Given that multiple CCs of different radio base stations are aggregated in DC, DC is also referred to as "inter-base station CA (inter-eNB CA)" and/or the like.

In existing LTE systems (for example, LTE Rel. 8 to 13), a user terminal receives downlink control information (DCI) via a downlink (DL) control channel (for example, PDCCH (Physical Downlink Control CHannel), EPDCCH (Enhanced Physical Downlink Control CHannel), MPDCCH (Machine-type communication (MTC) Physical Downlink Control CHannel), and so forth). Based on this DCI, the user terminal receives DL data channels (for example, PDSCH (Physical Downlink Shared CHannel)) and/or transmits UL data channels (for example, PUSCH (Physical Uplink Shared CHannel)).

Citation List

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, 5G, NR, etc.), research is underway to use higher frequency bands (for example, 3 to 40 GHz, etc.) than existing frequency bands, in order to achieve high speeds and large capacity (for example, as in enhanced mobile broad band (eMBB). In general, higher frequency bands suffer greater distance-induced attenuation, and this makes it difficult to ensure coverage. Therefore, MIMO (also referred to as "multiple input multiple output," "massive MIMO," and so on), which uses a large number of antenna elements, is under study.

In MIMO, which uses a large number of antenna elements, it is possible to form beams (antenna directivities) by controlling the amplitude and/or the phase of signals transmitted or received via each antenna element (this is referred to as "beamforming (BF)"). For example, when antenna elements are arranged two-dimensionally, the higher the frequency, the greater the number of antenna elements that can be arranged in an area (the number of antenna elements). When the number of antenna elements in a given area increases, the beam width narrows (becomes narrower), and the beamforming gain increases. Therefore, when beamforming is used, propagation loss (path loss) can be reduced, and coverage can be ensured even in high frequency bands.

Meanwhile, when beamforming is used (for example, when it is likely that narrower beams are used in higher frequency bands), the quality of beams (also referred to as, for example, "BPL (Beam Pair Link)") might deteriorate due to blockage caused by obstacles and/or suchlike factors, and, as a result of this, RLF (Radio Link Failure) might occur frequently. When RLF occurs, cell connections need to be re-established, so that, if RLF occurs frequently, this may lead to a degradation of system performance.

Therefore, in order to prevent the occurrence of RLF, when the quality of a specific beam deteriorates, it is preferable to switch to another beam adequately (this is referred to as "beam recovery," "L1/L2 beam recovery," and/or the like). In this case, the problem lies in based on what conditions BF (Beam Failure) should be detected and/or beam recovery should be triggered.

The present invention has been made in view of the above, and it is therefore an object of the present invention to provide a user terminal and a radio communication method, whereby beam recovery can be triggered properly.

Solution to Problem

In accordance with one aspect of the present invention, a user terminal has a transmission section that transmits a signal for requesting switching of an active beam that is used to transmit a downlink signal, and a control section that controls transmission of the request signal based on first received power, which is measured using a channel state information reference signal (CSI-RS) resource that is associated with the active beam, and a given threshold, and the control section controls the transmission of the request signal based on the first received power and second received power, which is measured using a CSI-RS resource that is associated with an inactive beam.

In accordance with another aspect of the present invention, a user terminal has a transmission section that transmits a signal for requesting switching of an active beam that is used to transmit downlink signals, and a control section that controls transmission of the request signal based on first received power, which is measured using a channel state information reference signal (CSI-RS) resource that is associated with the active beam, and a giventhreshold, and the control section controls transmission of the request signal based on third received power, which is measured using a synchronization signal (SS) block of the active beam, and fourth received power, which is measured using an SS block of the inactive beam.

Advantageous Effects of Invention

According to the present invention, beam recovery can be triggered properly.

DESCRIPTION OF EMBODIMENTS

Figure 1A:
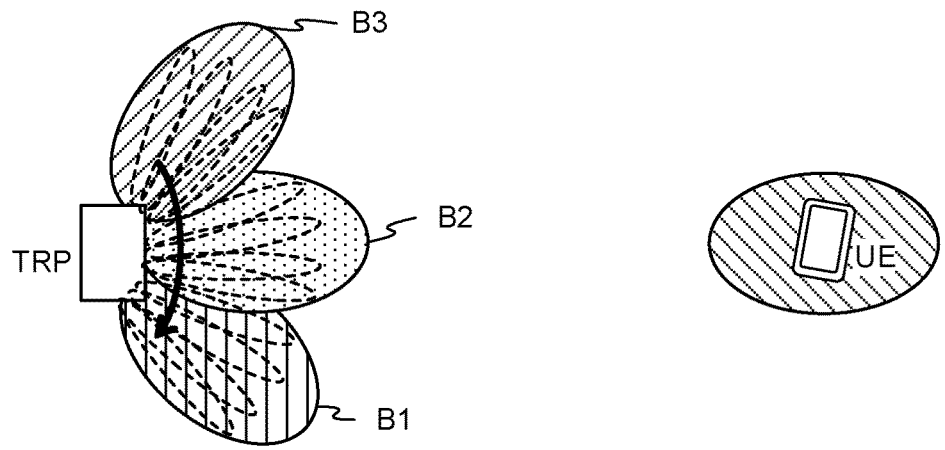
FIGS. 1A, 1B, and 1C are conceptual diagrams to show examples of beam management.

Future radio communication systems (for example, 5G, NR, LTE Rel. 14 and/or later versions and so on) anticipate use cases characterized by, for example, high speed and large capacity (for example, eMBB), a very large number of terminals (for example, massive MTC (Machine-Type Communication)), ultra-high reliability and low latency (for example, URLLC (Ultra Reliable and Low-Latency Communications)), and so on. Assuming these use cases, for example, studies are in progress to communicate using beamforming (BF) in future radio communication systems.

Beamforming (BF) includes digital BF and analog BF. Digital BF refers to a method of performing precoding signal processing on the baseband (for digital signals). In this case, inverse fast Fourier transform (IFFT)/digital-to-analog conversion (DAC)/RF (Radio Frequency) need to be carried out in parallel processes, as many as the number of antenna ports (RF Chains). Meanwhile, it is possible to form a number of beams to match the number of RF chains, at any arbitrary timing.

Analog BF refers to a method of using phase shifting devices on RF. In this case, since it is only necessary to rotate the phase of RF signals, analog BF can be realized with simple and inexpensive configurations, but it is still not possible to form a plurality of beams at the same time. To be more specific, when analog BF is used, each phase shifting device can only form one beam at a time.

Thus, if a radio base station (referred to as, for example, "gNB (gNodeB)," "TRP (Transmission and Reception Point," "TRxP (Transmission and Reception x Point)," "eNB (eNode B)," "BS (Base Station)," and so on) has only one phase shifter, the radio base station can only form one beam at any given time. Therefore, when multiple beams are transmitted using analog BF alone, these beams cannot be transmitted simultaneously using the same resource, and the beams need to be switched, rotated and so on, over time.

Note that it is also possible to adopt a hybrid BF design that combines digital BF and analog BF. Although, for future radio communication systems, studies are underway to introduce MIMO (for example, massive MIMO), which uses a large number of antenna elements, attempting to form an enormous number of beams using digital BF alone might result in an expensive circuit design. For this reason, there is a possibility that hybrid BF will be used in future radio communication systems.

When BF (including digital BF, analog BF, hybrid BF and so forth) is used as described above, the quality of beams (also referred to as, for example, "BPL (Beam Pair Link)") might deteriorate due to blockage caused by obstacles and/or suchlike factors, and, as a result of this, RLF (Radio Link Failure) might occur frequently. When RLF occurs, cell connections need to be re-established, so that, if RLF occurs frequently, this may lead to a degradation of system performance. Therefore, there is a plan to introduce beam management in order to ensure the robustness of BPL.

FIG. 1 provide diagrams to show examples of beam management. FIG. 1A shows the management of beams for use for signals (mobility measurement signal) mobility (RRM (Radio Resource Management)) measurements, L3 (Layer 3) measurements, L3-RSRP (Layer 3-Reference Signal Received Power) measurements (also referred to as "L3 mobility measurements") and so on. Beams that are used for mobility measurement signals may be rough beams that have relatively large beam widths. Also, since one or more beams having relatively small beam widths (also referred to as "finer beams," "narrower beams," and/or the like) can be arranged inside a rough beam, a rough beam may be referred to as a "beam group."

Here, mobility measurement signals may be also referred to as "SS (Synchronization Signal) blocks," "MRS (Mobility Reference Signals)," "CSI-RSs (Channel State Information Reference Signals)," "beam-specific signals," "cell-specific signals," and so on. An SS block refers to a signal group that includes at least one of a PSS (Primary Synchronization Signal), an SSS (Secondary Synchronization Signal) and a broadcast channel (for example, a PBCH (Physical Broadcast CHannel)). In this way, a mobility measurement signal may be at least one of the PSS, the SSS, the PBCH, the MRS and the CSI-RS, or may be a signal that is formed by enhancing and/or modifying at least one of the PSS, the SSS, the PBCH, the MRS and the CSI-RS (for example, a signal that is formed by changing the density and/or the cycle of at least one of these signals).

Note that, referring to FIG. 1A, a user terminal may be either in RRC connected mode or idle mode, but the user terminal has only to be in a mode in which the user terminal can identify the configurations of mobility measurement signals. Also, the user terminal does not have to form Rx beams (receiving beams).

In FIG. 1A, a radio base station (also referred to as "TRP") transmits mobility measurement signals (for example, SS blocks and/or CSI-RSs) that are associated with beams B1 to B3. In FIG. 1A, analog BF is used, so that the mobility measurement signals associated with beams B1 to B3 are all transmitted at different times (for example, in different symbols, slots and so on) (this is also referred to as "beam sweeping"). When digital BF is used, the MRSs associated with beams B1 to B3 may be transmitted at the same time.

The user terminal (UE) conducts L3 measurements using the mobility measurement signals associated with beams B1 to B3. Note that, in L3 measurements, the received power (for example, at least one of RSRP and RSSI (Reference Signal Strength Indicator)) and/or the received quality (for example, at least one of RSRQ (Reference Signal Received Quality), SNR (Signal-Noise Ratio) and SINR (Signal-to-Interference plus Noise Power Ratio) of mobility measurement signals may be measured.

Also, the user terminal may select (group) beams (beam groups) based on what results the L3 measurements derive. For example, in FIG. 1A, the user terminal may classify beam B2 as an active beam and beams B1 and B3 as inactive beams (backup beams). Here, an active beam may refer to a beam that can be used for a DL control channel (hereinafter also referred to as "NR-PDCCH") and/or a DL data channel (hereinafter also referred to as "PDSCH"), and an inactive beam may refer to a beam (candidate beam) that is not an active beam. A set of one or more active beams may be referred to as an "active beam set" and so on, and a set of one or more inactive beams may be referred to as an "inactive beam set" and so on.

The user terminal transmits a measurement report (MR) that contains the identifiers of one or more beams (also referred to as "beam IDs," "beam indices (BIs)" and so on) and/or the measurement results of these beams, by using higher layer signaling (for example, RRC signaling). Note that, instead of beam IDs, the mobility measurement signals' resources, antenna ports and so on may be reported. For example, in FIG. 1A, the user terminal transmits a measurement report including the B1 and/or the RSRP of beam B2 with the best RSRP.

Figure 1B:
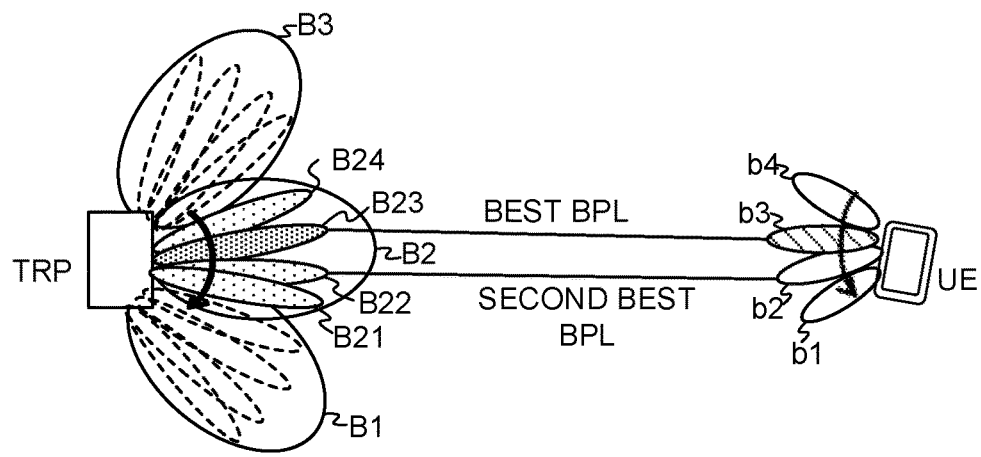

FIG. 1B shows L1 (physical layer) beam managements (also referred to as "beam measurements," "L1 (Layer 1) measurements," "CSI (Channel State Information) measurements," "L1-RSRP measurements," and so forth). Signals that are subject to beam measurements (beam measurement signal) may include at least one of a CSI-RS, an SS block, a PSS, an SSS, a PBCH and an MRS, or signals that are formed by enhancing and/or modifying at least one of these signals (for example, signals that are formed by changing the density and/or the cycle of at least one of these signals) may be used.

For example, in L1 beam management, beams (also referred to as "Tx beams," "transmitting beams," and/or the like) for use for transmitting the NR-PDCCH and/or the PDSCH (hereinafter also referred to as "NR-PDCCH/PDSCH") and/or beams (also referred to as "Rx beams," "receiving beams," and/or the like) for use for receiving these NR-PDCCH/PDSCH are managed.

In FIG. 1B, the radio base station (TRP) transmits configuration information pertaining to K (here, K=4) CSI-RS resources #1 to #4, which are associated with K Tx beams B21 to B24, to the user terminal.

A CSI-RS resource may refer to, for example, at least one of a NZP (Non-Zero-Power) CSI-RS resource and a ZP (Zero-Power) CSI-RS resource for IM (Interference Measurements). The user terminal measures CSI for each CSI process in which one or more CSI-RS resources are configured. A CSI-RS resource can be replaced with a CSI-RS (including a NZP-CSI-RS and/or a ZP-CSI-RS) that is transmitted using this CSI-RS resource.

The user terminal (UE) measures configured CSI-RS resources #0 to #3. To be more specific, the user terminal conducts L1 measurements (for example, CSI measurements and/or L1-RSRP measurements) for K CSI-RS resources that are respectively associated with K (here, K=4) Tx beams B21 to B24, and generates CSI and/or L1-RSRP based on the measurement results.

Here, the CSI may include at least one of a CQI (Channel Quality Indicator), a PMI (Precoding Matrix Indicator), an RI (Rank Indicator), and a CRI (CSI-RS Resource Indicator). As mentioned earlier, Tx beams are associated with CSI-RS resources, so that it is possible to say that a CRI specifies a Tx beam.

Based on the measurement results of K Tx beams (or corresponding K CSI-RS resources), the user terminal selects N (K≤N) Tx beams. Here, the number of Tx beams, or "N," may be determined in advance, configured by higher layer signaling, or specified by physical layer signaling.

The user terminal may determine which Rx beam is suitable for each Tx beam that is selected, and select beam pair links (BPLs). Here, a BPL refers to an optimal combination of a Tx beam and an Rx beam. For example, in FIG. 1B, the combination of Tx beam B23 and Rx beam b3 is selected as the best BPL, and the combination of Tx beam B22 and Rx beam b2 is selected as the second best BPL.

The user terminal transmits N CRIs, which correspond to the N Tx beams selected, and at least one of the CQIs, RIs and PMIs of the N Tx beams as shown by the N CRIs, to the radio base station. Also, the user terminal may transmit the RSRPs of N Tx beams to the radio base station. Also, the user terminal may transmit the IDs of the Rx beams (also referred to as "Rx beam IDs," "BIs," "beam IDs," and/or the like) corresponding to the N Tx beams.

The radio base station selects the TX beam (or the BPL) to use for the NR-PDCCH and/or the PDSCH (NR-PDCCH/PDSCH), and indicates this Tx beam (or BPL) to the user terminal. To be more specific, the radio base station may select the Tx beam to use for the NR-PDCCH and/or the PDSCH (NR-PDCCH/PDSCH) based on N CSIs from the user terminal (for example, N CRIs, at least one of the CQIs, RIs and PMIs of the Tx beams as shown by these N CRIs, and so on) and/or L1-RSRPs from the user terminal. Also, the radio base station may select a BPL based on the Rx beam ID of the Rx beam corresponding to this Tx beam.

Beams may be indicated from the radio base station to the user terminal based on associations (QCL (Quasi-Co-Location)) between the antenna ports (DMRS ports) of NR-PDCCH/PDSCH demodulation reference signals (DMRSs) and CSI-RS resources. Note that the QCL between DMRS ports and CSI-RS resources may be indicated separately for the NR-PDCCH and the PDSCH.

Figure 1C:
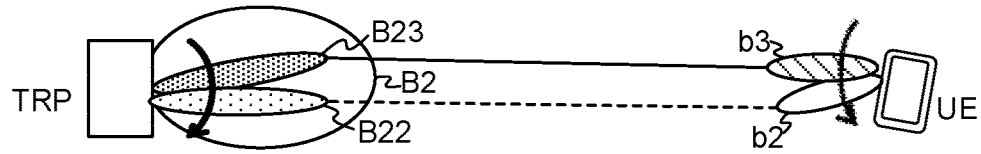

For example, in FIG. 1C, information to show the association between CSI-RS resource #2 of the best BPL (Tx beam B23 and Rx beam b3) in FIG. 1B and DMRS port #0, and the association between CSI-RS resource #1 of the second best BPL (Tx beam B22 and Rx beam b2) and DMRS port #1 is reported from the radio base station to the user terminal via higher layer signaling and/or physical layer signaling (for example, DCI).

In FIG. 1C, the user terminal demodulates the NR-PDCCH/PDSCH on assumption that, in DMRS port #0, this NR-PDCCH is transmitted by using Tx beam B23, where the best measurement result of CSI-RS resource #2 has been derived. Furthermore the user terminal may demodulate the NR-PDCCH/PDSCH by using Rx beam b3, which corresponds to this Tx beam B23.

The user terminal demodulates the NR-PDCCH/PDSCH on assumption that, in DMRS port #1, the NR-PDCCH is transmitted by using Tx beam B22, where the best measurement result of CSI-RS resource #1 has been derived. Furthermore the user terminal may demodulate the NR-PDCCH/PDSCH by using Rx beam b2, which corresponds to this Tx beam B22.

In the beam management described above, problems that might arise when the quality of specific beams deteriorates have to do with based on what conditions BF (Beam Failure) should be detected and/or beam recovery should be triggered.

Now, in the future radio communication systems (for example, NR, 5G, LTE Rel. 14 and/or later versions, and so on) it is predicted that CSI-RS resources common to L1-RSRP measurements and L3-RSRP measurements, or individual CSI-RS resources, will be configured.

Figure 2A:
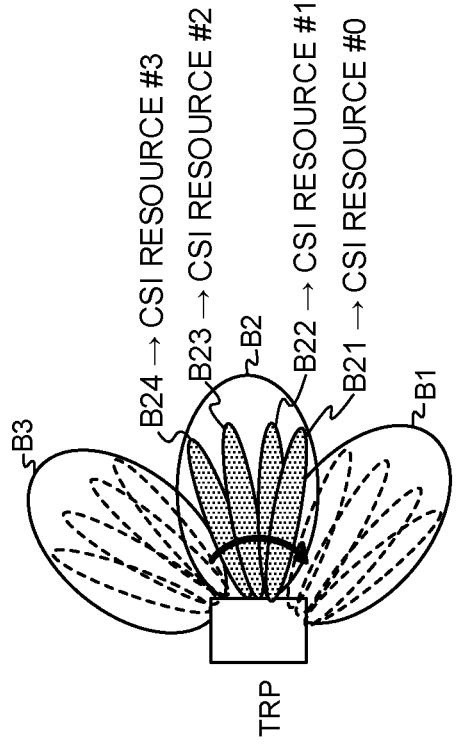
FIGS. 2A and 2B are diagrams to show examples of CSI-RS resource configurations.

FIG. 2 provide diagrams to show examples of CSI-RS resource configurations. FIG. 2A shows examples of CSI-RS resource configurations, which apply in common to L1-RSRP measurements and L3-RSRP measurements. For example, in FIG. 2A, the user terminal performs L1-RSRP measurements and L3-RSRP measurements by using CSI-RS resources #0 to #3 that are associated respectively with Tx beams B21 to B24. Note that, in FIG. 2A, the same RSRP that is measured based on each CSI-RS resource can be used as an L1-RSRP and/or as an L3-RSRP.

Figure 2B:
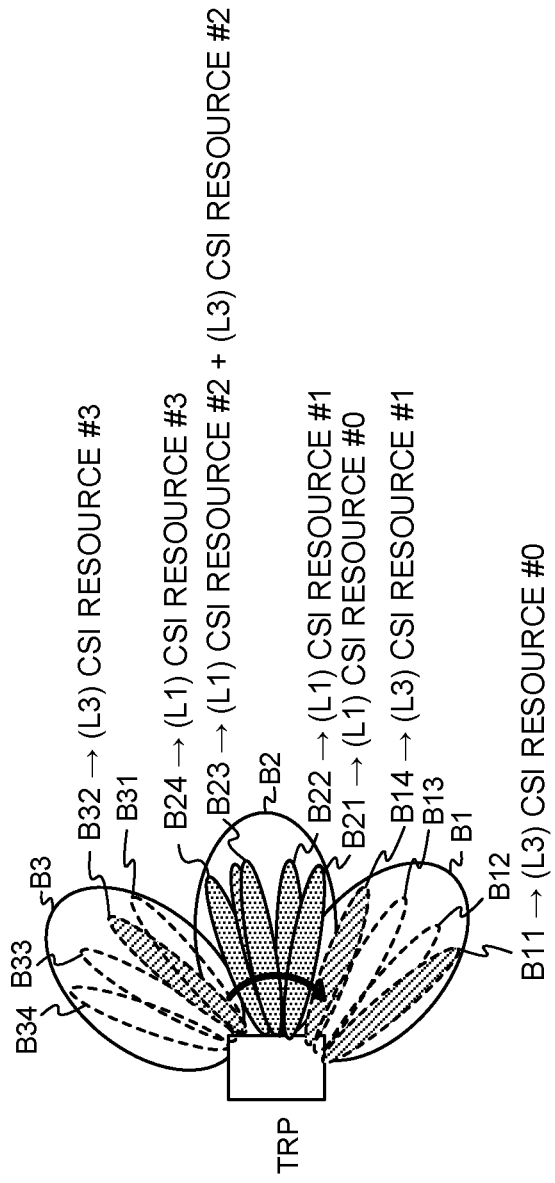

FIG. 2B shows examples of separate configurations of CSI-RS resources for L1-RSRP measurements (hereinafter also referred to as "(L1) CSI-RS resources") and CSI-RS resources for L3-RSRP measurements (hereinafter also referred to as "(L3) CSI-RS resources").

For example, in FIG. 2B, the user terminal performs L1-RSRP measurements by using (L1) CSI-RS resources #0 to #3, which are associated respectively with Tx beams B21 to B24. Also, the user terminal performs L3-RSRP measurements by using (L3) CSI-RS resources #0 to #3, which are associated respectively with Tx beams B11, B14, B23 and B32. Note that, although not shown in the drawings, the (L3) CSI-RS resources may be associated with rough beams (for example, Tx beams B1 to B3).

While L1-RSRP is used for beam management (for example, beam management for the NR-PDCCH/PDSCH), L3-RSRP is more likely to be used in mobility management. Consequently, as shown in FIG. 2B, (L1) CSI-RS resources #0 to #3 are associated with a given number of Tx beams (here, B21 to B24) in a relatively narrow range. On the other hand, (L3) CSI-RS resources #0 to #3 are associated with a given number of Tx beams (here, B11, B14, B23 and B32) that are provided over a wider range than (L1) CSI-RS resources #0 to #3.

Note that, in FIG. 2B, (L1) CSI-RS resource and (L3) CSI-RS resource are associated with beams of the same beam width (finer beams) but (L3) CSI-RS resources may be associated with beams having larger beam widths (rough beams, and beams B1 to B3 of FIG. 2B are examples) than the beams of (L1) CSI-RS resources. By associating (L3) CSI-RS resources to the rough beam, it is possible to cover a wider range.

Thus, in future radio communication systems, CSI-RSs (CSI-RS resources) are used to measure at least one of CSI, L1-RSRP and L3-RSRP. However, when the number of beams in which CSI-RS resources are configured increases, there is a possibility that the burden of measurements on user terminals will increase. For this reason, envisaging future radio communication systems, a study is in progress to limit the number of beams to configure CSI-RS resources, and conduct L1-RSRP measurements and/or L3-RSRP measurements by using SS blocks.

Thus, future radio communication systems (for example, NR, 5G, LTE Rel. 14 and/or later versions, etc.) are anticipated to measure the received power (for example, the L1-RSRP and/or the L3-RSRP) of one or more beams by using multiple different measurement signals (for example, CSI-RSs and/or SS blocks). The problem in this case has to do with what conditions should be applied to determine when beam recovery should be triggered.

So the present inventors have worked on a method of detecting BF (Beam Failure) and/or triggering beam recovery properly when the received power (for example, the L1-RSRP and/or the L3-RSRP) of one or more beams is measured using different measurement signals (for example, CSI-RSs and/or SS blocks), and arrived at the present invention.

Now, embodiments of the present invention will be described below in detail with reference to the accompanying drawings. Note that although the beamforming in according to the herein-contained embodiments of the present invention presumes digital BF, analog BF and hybrid BF can be applied as appropriate.

Also, "beams" according to the herein-contained embodiments of the present invention may include beams that are used to transmit DL signals from radio base stations (also referred to as "transmitting beams," "Tx beams," and so on) and/or beams that are used to receive DL signals at user terminals (also referred to as "receiving beams," "Rx beams," and so on). Combinations of Tx beams and Rx beams may be referred to as "beam pair links (BPLs)" and/or the like.

(Beam Measurements)

Now, beam measurements according to the present embodiment will be exemplified below with reference to FIG. 3 and FIG. 4.

Figure 3:
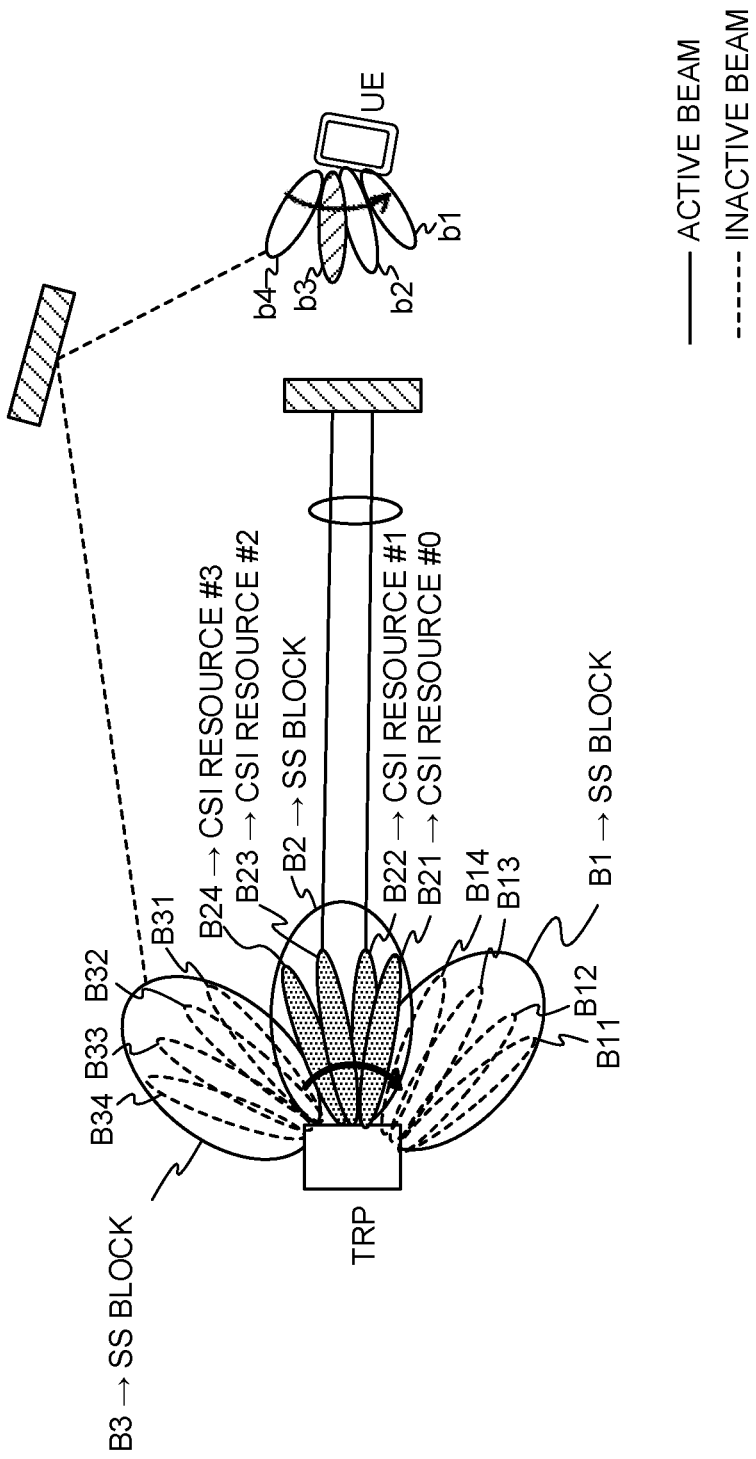
FIG. 3 is a diagram to show an example of measuring beams according to the present embodiment.

FIG. 3 is a diagram to show an example of measuring beams according to the present embodiment. For example, in FIG. 3, CSI-RS resources #0 to #3 are configured in Tx beams B21 to B24 in beam B2 (active beam), respectively. Meanwhile, Tx beams B11 to B14 and B31 to B34 in beams B1 and B3 (inactive beams, backup beams, and so on) have no CSI-RS resources configured.

In FIG. 3, the L1-RSRPs and/or the L3-RSRPs of Tx beams B21 to B24 are measured using CSI-RS resources #0 to #3, respectively. Meanwhile, the L1-RSRPs and/or the L3-RSRPs of beams B1 and B3 are measured by using respective SS blocks. Note that, in FIG. 3, the L1-RSRP and/or the L3-RSRP of beam B2 may be measured using SS blocks.

Figure 4:
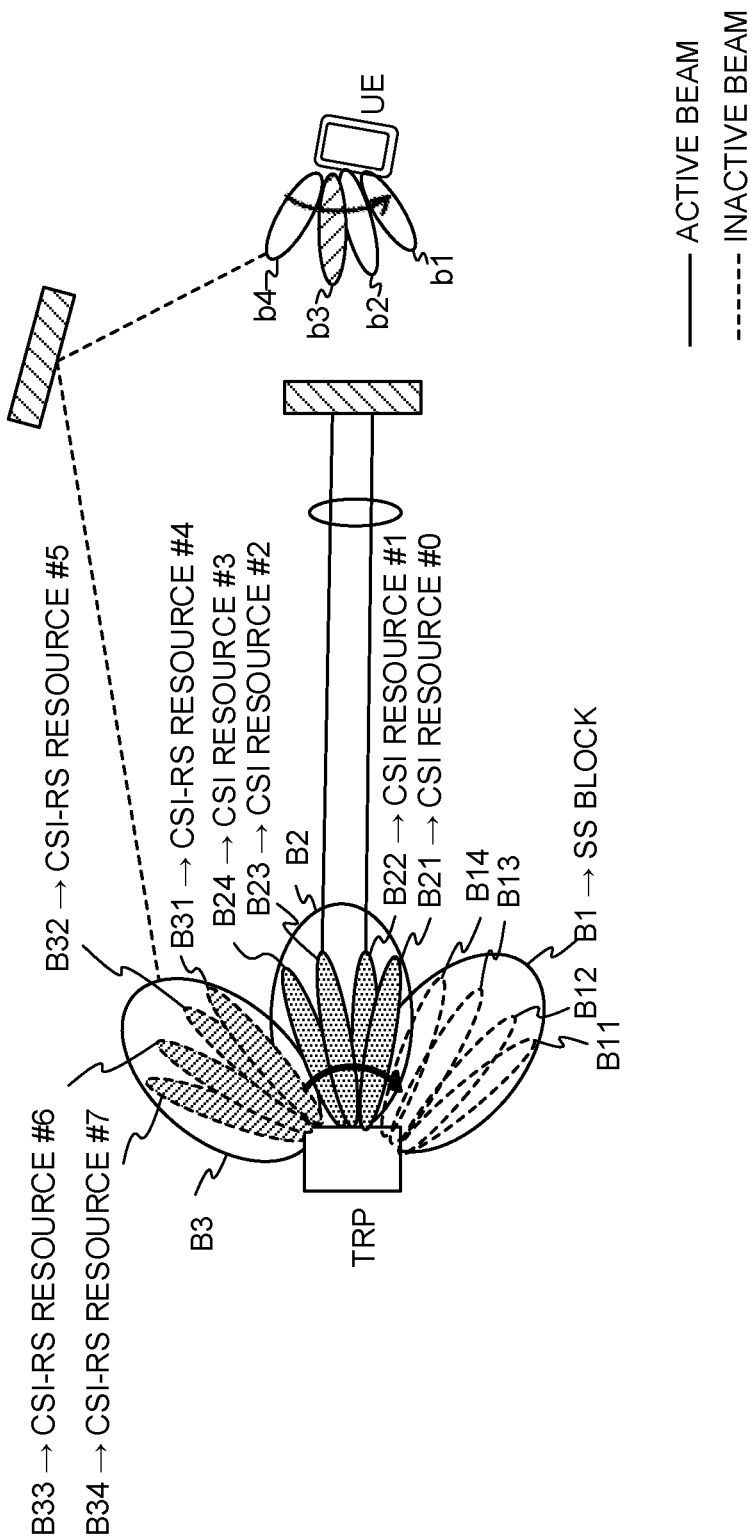
FIG. 4 is a diagram to show another example of measuring beams according to the present embodiment.

FIG. 4 is a diagram to show another example of measuring beams according to the present embodiment. For example, in FIG. 4, CSI-RS resources #0 to #7 are configured in Tx beams B21 to B24 in beam B2, and in Tx beams B31 to B34 in beam B3, respectively. Here, assume that Tx beams B21 to B24 are activated, and Tx beams B31 to B34 are deactivated. Meanwhile, CSI-RS resources are not configured in Tx beams B11 to B14 of beam B1. Alternatively, CSI-RS resources #0 to #3 are configured to measure L1-RSRP for beam management, and CSI-RS resources #0 to #7 are configured to measure L3-RSRP for mobility management.

In FIG. 4, the L1-RSRPs and/or the L3-RSRPs of Tx beams B21 to B24 are measured using CSI-RS resources #0 to #3, respectively. Also, the L1-RSRPs and/or the L3-RSRPs of Tx beams B31 to B34 are measured using CSI-RS resources #4 to #7, respectively. Meanwhile, the L1-RSRP and/or the L3-RSRP of beam B1 are measured using respective SS blocks.

Note that, in FIG. 4, the L1-RSRPs and/or the L3-RSRPs of beams B2 and/or B3 may be measured using SS blocks. Also, although the CSI-RS resources in FIG. 3 and FIG. 4 are associated with narrow beams, the CSI-RS resources may be associated with rough beams (for example, beams B1 to B3), and the rough beams' L1-RSRPs and/or L3-RSRPs may be measured using CSI-RS resources.

Also, in FIG. 3 and FIG. 4, L1-RSRP and/or L3-RSRP are measured using CSI-RS resources that are configured, it is equally possible to measure CSI using these CSI-RS resources.

(Trigger Conditions)

Now, trigger conditions for transmitting a beam recovery request signal (beam recovery signal) according to the present embodiment will be described below with reference to FIG. 3 to FIG. 6. Provided that the beam recovery signal is transmitted when a beam failure event occurs, the trigger conditions may be referred to as "beam failure event conditions." Also, the beam recovery signal may serve as a signal for reporting the occurrence of a beam failure.

<First Trigger Conditions>

The first trigger conditions presume that L CSI-RS resources are configured to measure L3-RSRP, and N CSI-RS resources are configured to measure L1-RSRP. For example, a case may be assumed below in which, as shown in FIG. 4, CSI-RS resources #0 to #3, associated with N Tx beams B21 to B24 (active beams), are configured for L1-RSRP measurements, and CSI-RS resources #4 to #7, associated with L Tx beams B21 to B24 (inactive beams), are configured for L3-RSRP measurements.

Figure 5:
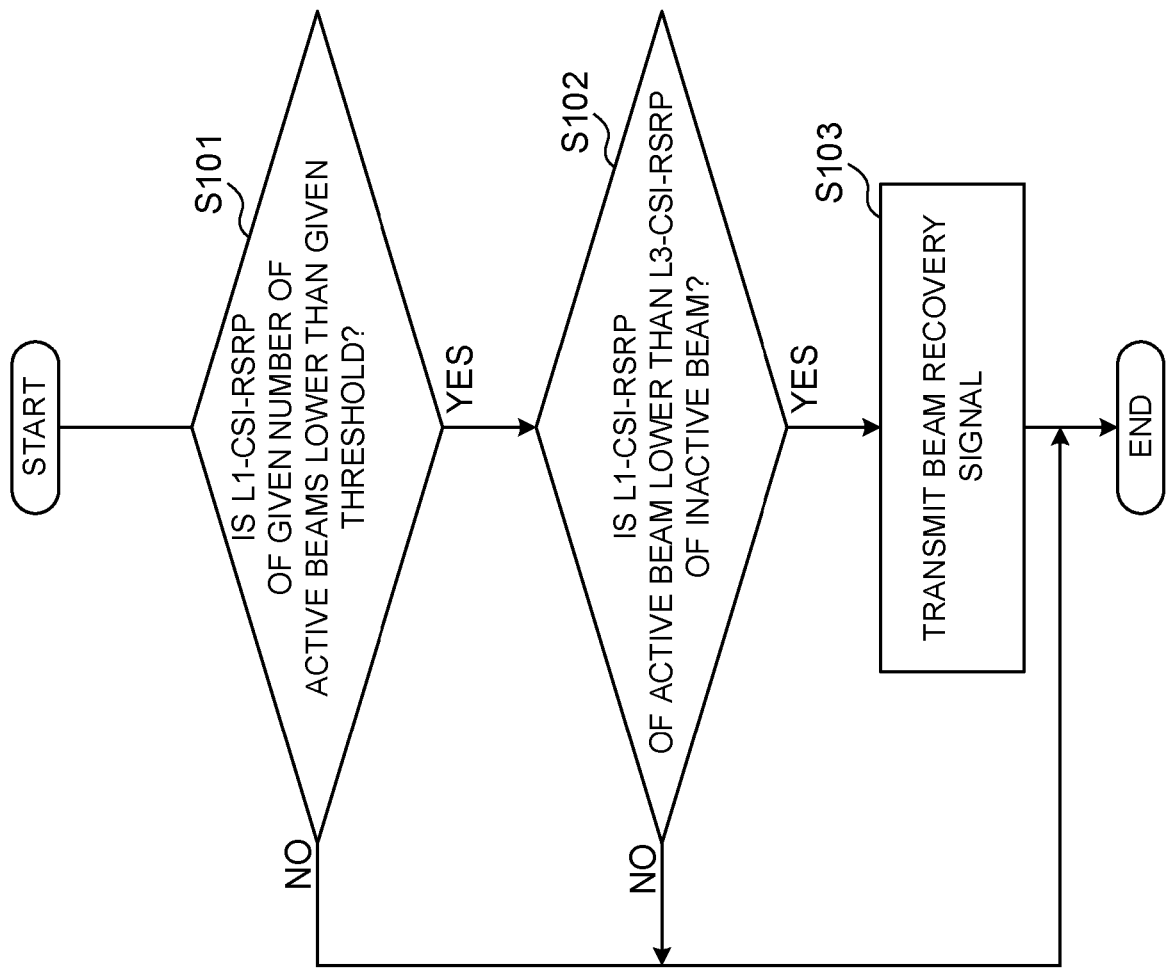
FIG. 5 is a flowchart to show examples of first trigger conditions according to the present embodiment.

FIG. 5 is a flowchart showing examples of the first trigger conditions according to the present embodiment. As shown in FIG. 5, in step S101, a user terminal compares L1-RSRPs (also referred to as "L1-CSI-RSRPs" and/or the like) that have been measured based on the CSI-RS resources of a given number of active beams, against a given threshold.

A given number of active beams here may be N Tx beams (for example, Tx beams B21 to B24 in FIG. 4) that are associated with N CSI-RS resources configured for L1-RSRP measurements. Alternatively, the above given number of active beams may be M (M≤N) Tx beams, the measurement results of which are reported to the radio base station, among the N Tx beams.

For example, in step S101, the user terminal may determine whether the L1-CSI-RSRPs of a given number of active beams are lower than a given threshold or not. The user terminal may also determine whether the L1-CSI-RSRP of the lowest-quality active beam is lower than a given threshold or not. Alternatively, the user terminal may determine whether the L1-CSI-RSRP of the highest-quality active beam is greater than a given threshold or not.

If the L1-CSI-RSRPs of a given number of active beams (or the L1-CSI-RSRP of the active beam of the worst quality or the best quality) is lower than a given threshold, the user terminal may proceed to step S102. Alternatively, the user terminal may proceed to step S102 when the state fulfilling the above condition continues for a given period or longer.

In step S102, the user terminal compares the above L1-CSI-RSRPs, measured based on the CSI-RS resources of active beams, and L3-RSRPs (also referred to as "L3-CSI-RSRPs" and so on) that have been measured based on the CSI-RS resources of inactive beams.

For example, in step S102, the user terminal may determine whether or not the L1-CSI-RSRP of an active beam in use (for example, at least one of Tx beams B21 and B22 in FIG. 4) is lower than the L3-CSI-RSRP of an inactive beam (for example, at least one of Tx beams B31 to B32 of FIG. 4). Alternatively, the user terminal may determine whether or not the value given by adding a given offset to the L1-CSI-RSRP is lower than the L3-CSI-RSRP.

If the L1-CSI-RSRP of the active beam (or the value given by adding a given offset to the L1-CSI-RSRP, where the offset can take a positive value or a negative value) is smaller than the L3-CSI-RSRP of the inactive beam, the user terminal may proceed to step S103. Alternatively, the user terminal may proceed to step S103 when the state fulfilling the above condition continues for a given period or longer.

When the conditions of both step S101 and step S102 are fulfilled, a beam failure event occurs, and, in step S103, the user terminal transmits a beam recovery signal. Note that, in FIG. 5, the order of steps S101 and S102 in FIG. 5 may be reversed, or steps S101 and S102 may be performed at the same time.

According to the first trigger conditions, the transmission of a beam recovery signal is triggered (a beam failure event occurs) based on the L1-CSI-RSRPs of active beams and the L3-CSI-RSRPs of inactive beams (for example, Tx beams B31 to B33 of FIG. 4), so that, when CSI-RSI resources are configured in inactive beams, the user terminal can properly recognize the presence of candidate Tx beams to switch to, and carry out beam recovery in a proper way.

Also, although no CSI-RS resource is associated with L rough beams (for example, beams B1 to B3) in FIG. 4, it is nevertheless possible to associate L rough beams with CSI-RS resources. For example, in FIG. 4, CSI-RS resources #0 to #3, associated with N Tx beams B21 to B24 (active beams), are configured for L1-RSRP measurements, and CSI-RS resources #4 to #6, associated with L rough beams (for example, beams B1 to B3), are configured for L3-RSRP measurements.

In this case, in step S102, the L1-CSI-RSRPs of active beams and the L3-CSI-RSRPs of rough beams vary in terms of the range of beams, the accuracy of measurements and so forth, and, in some cases, should not be compared as-is. Assuming such cases, in step S102, instead of active beams' L1-CSI-RSRPs, an L3-CSI-RSRP that is measured based on a CSI-RS resource associated with CSI-RS resources #0 to #3 (for example, CSI-RS #5) may be compared with an inactive beam's L3-CSI-RSRP.

Here, CSI-RS resources #0 to #3 for beam managements and/or CSI measurements and the CSI-RS resources for mobility management may be associated with each other based on QCL (Quasi-Co-Location), by way of commands sent from the base station to the UE. To be more specific, information to represent these associations is reported via higher layer signaling when CSI-RS resources #0 to #3 for beam management and/or CSI measurements are configured.

<Second Trigger Conditions>

The second trigger conditions presume that L CSI-RS resources are not configured to measure L3-RSRP, and N CSI-RS resources are configured to measure L1-RSRP.

For example, a case may be assumed below in which, as shown in FIG. 3, CSI-RS resources #0 to #3, associated with N Tx beams B21 to B24 (active beams), are configured for L1-RSRP measurements, but no CSI-RS resource for L3-RSRP measurements is configured in inactive beams. Note that FIG. 3 might also assume that L1-RSRP and/or L3-RSRP (also referred to as "L1/L3-SS-RSRP" and so on) are measured using respective SS blocks of beams B1 to B3.

Figure 6:
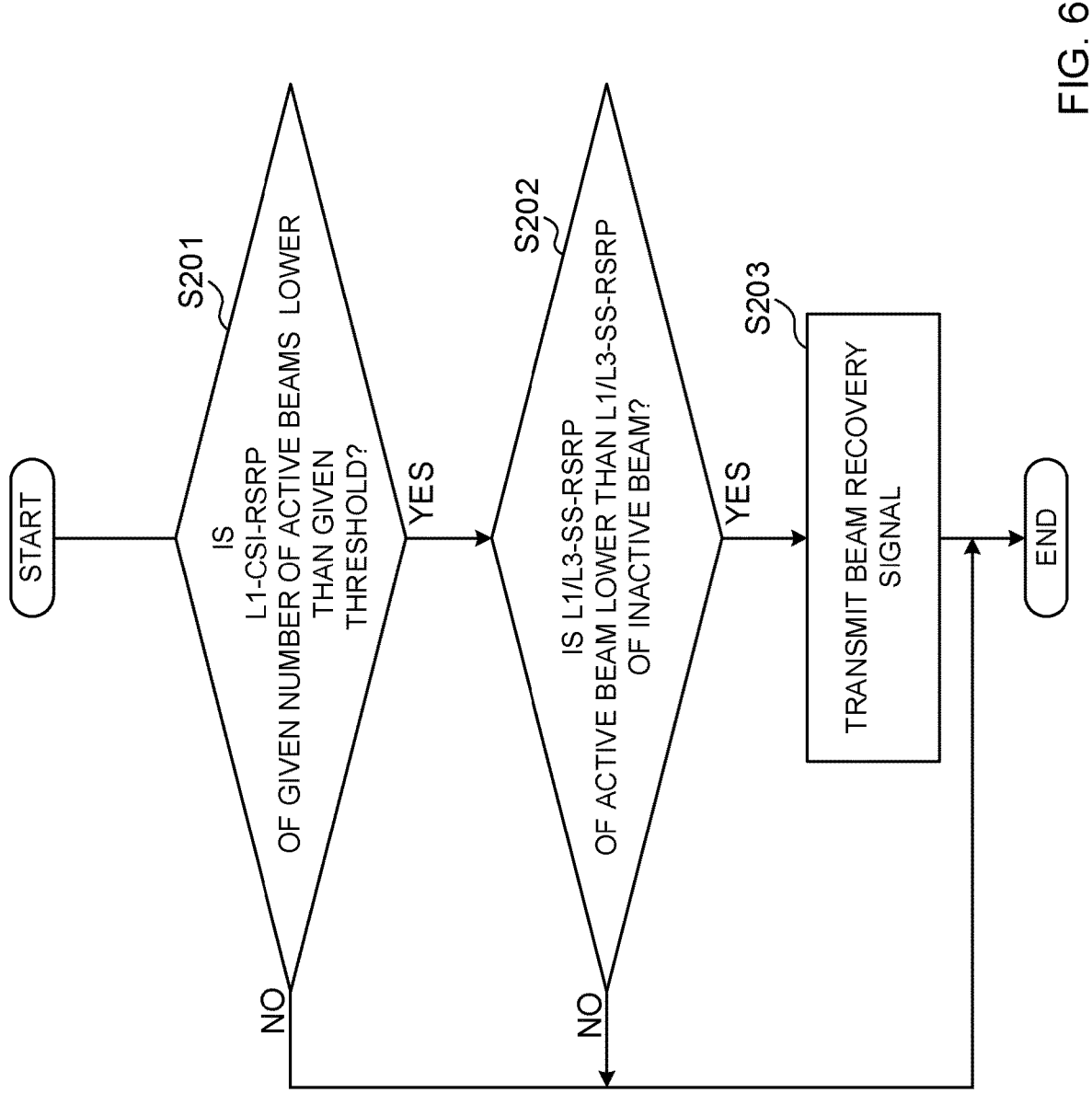
FIG. 6 is a flowchart to show examples of second trigger conditions according to the present embodiment.

FIG. 6 is a flowchart showing examples of the second trigger conditions according to the present embodiment. Steps S201 and S203 of FIG. 6 are similar to steps S101 and S103 of FIG. 5, respectively. Note that, as has been the case with FIG. 5, the order of steps S201 and S202 may be reversed, or steps S201 and S202 may be performed at the same time.

In step S202, the user terminal compares the L1/L3-SS-RSRPs of active beams with the L1/L3-SS-RSRPs of inactive beams.

Here, the user terminal can learn which SS blocks correspond to active beams based on the association between CSI-RS resources #0 to #3 for beam managements and/or CSI measurements and SS blocks for mobility management. CSI-RS resources #0 to #3 and SS blocks may be associated with each other based on QCL (Quasi-Co-Location), by way of commands sent from the base station to the UE. To be more specific, information to represent these associations is reported via higher layer signaling when CSI-RS resources #0 to #3 for beam management and CSI measurements are configured.

For example, the user terminal may determine whether or not the L1/L3-SS-RSRP of an active beam (for example, beam B2 in FIG. 3) is lower than the L1/L3-SS-RSRP of an inactive beam (for example, at least one of beams B1 and B3 of FIG. 3). Alternatively, the user terminal may determine whether or not the value given by adding a offset to the L1/L3-SS-RSRP of an active beam is lower than the L1/L3-SS-RSRP of an inactive beam.

If the L1/L3-SS-RSRP of the active beam (or the value given by adding a offset to the L1/L3-SS-RSRP) is lower than the L1/L3-SS-RSRP of the inactive beam, the user terminal may proceed to step S203. Alternatively, the user terminal may proceed to step S203 when the state fulfilling the above condition continues for a given period or longer.

According to the second trigger conditions, the transmission of a beam recovery signal is triggered (a beam failure event occurs) based on the L1/L3-SS-RSRPs of active beams and the L1/L3-SS-RSRPs of inactive beams, so that, when no CSI-RSI resource is configured in inactive beams, the user terminal can properly recognize the presence of candidate Tx beams to switch to, and carry out beam recovery in a proper way.

<Other Trigger Conditions>

Note that the trigger conditions for transmit the beam recovery signal are by no means limited to the above first and second trigger conditions. At least one of L3-RSRP (L3-SS-RSRP), measured using SS blocks, L1-RSRP (L1-SS-RSRP), measured using SS blocks, L3-RSRP (L3-CSI-RSRP), measured using CSI-RS resources, and L1-RSRP (L1-CSI-RSRP), measured using CSI-RS resources can be used to determine trigger conditions.

Also, SS blocks may be transmitted in rough beams (for example, at least one of beams B1 to B3 of FIG. 3 and FIG. 4). Furthermore, CSI-RS resources may be configured in rough beams (for example, at least one of beams B1 to B3 of FIG. 3 and FIG. 4) and/or in narrow beams (for example, at least one of Tx beams B11 to B14, B21 to B24 and B31 to B34 in FIG. 3 and FIG. 4). As described above with reference to FIGS. 2A and 2B, common CSI-RS resources may be configured for L1-CSI-RSRP measurements and L3-CSI-RSRP measurements, or separate CSI-RS resources may be configured.

Also, the trigger conditions may be determined not only by considering RSRP, but also by taking RSRQ into account. Similar to RSRP, RSRQ may also be measured in one or more layers (for example L1 and/or L3) using SS blocks and/or CSI-RS resources. Also, the trigger condition may be determined by taking into account the CSI of K Tx beams where CSI-RS resources are configured.

(Recovery Operation)

Now, beam recovery operation using the above-described trigger conditions will be described below with reference to FIG. 7.

Figure 7:
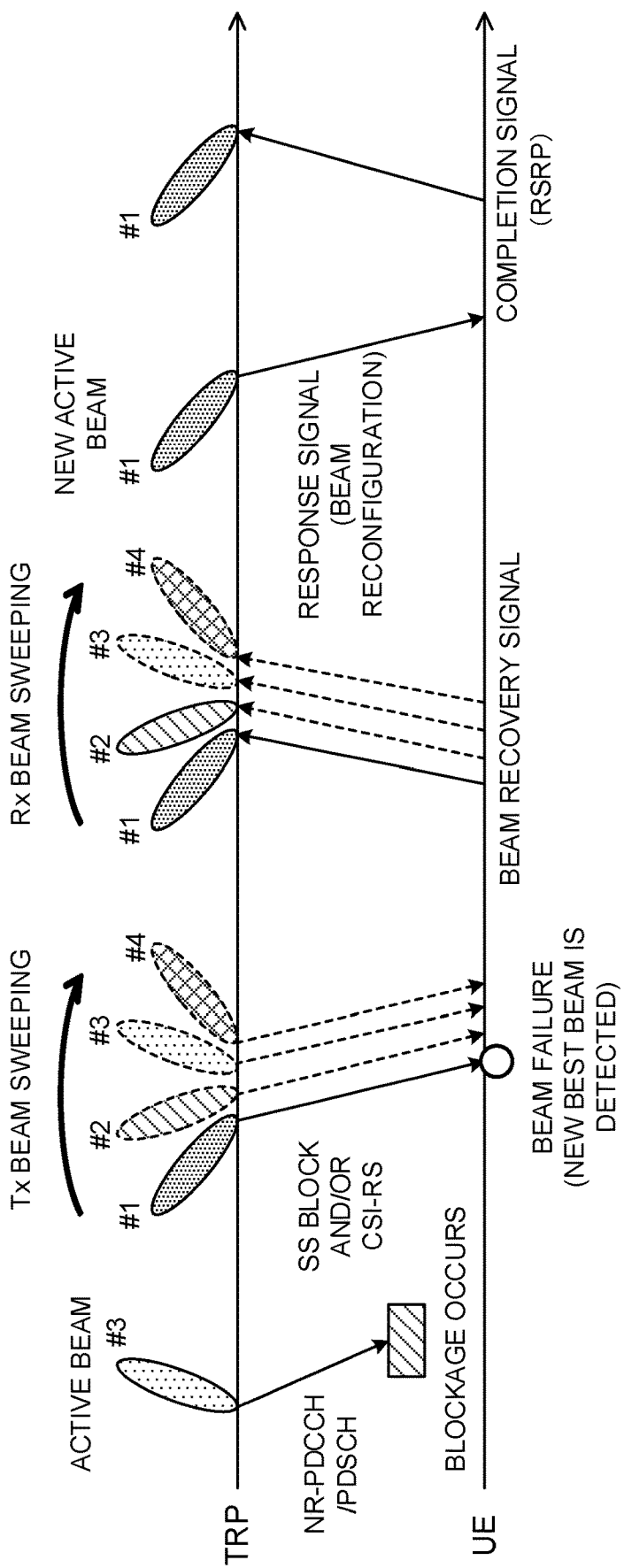
FIG. 7 is a diagram to show an example of recovery operation according to the present embodiment.

FIG. 7 is a diagram to show an example of recovery operation according to the present embodiment. Note that FIG. 7 assumes a case where Tx beam #3 is an active beam, and Tx beams #1, #2 and #4 are inactive beams.

In FIG. 7, the user terminal measures at least one of L3-RSRP, L3-RSRQ and L1-RSRQ, in a given cycle, based on mobility measurement signals (for example, SS blocks and/or CSI-RSs). The user terminal detects the occurrence of a beam failure (new best beam) based on the above trigger conditions.

The user terminal transmits a beam recovery signal (for example, a PRACH preamble, a scheduling request (SR), or a UL grant free-UL signal). The beam recovery signal may be transmitted using the UL resource that is associated with the mobility measurement signal's resource (or antenna port). As a result of this, the user terminal can report the beam ID of the new best beam to the radio base station in an implicit way.

Also, the beam recovery signal may include at least one of the beam ID (or information related to the beam ID (for example, CRI)), the L3-RSRP, the L1-RSRP, the L3-RSRQ and the L1-RSRQ of a candidate beam to switch to. If none of these is included, an SR that is modulated based on BPSK (Binary Phase Shift Keying) or QPSK (Quadrature Phase Shift Keying) may be used as this beam recovery signal.

Also, when UL is out of synchronization, a PRACH may be used as this beam recovery signal. In this case, the user terminal may transmit a PRACH to serve as a beam recovery signal by using a different resource from that used upon initial access.

The radio base station transmits a response signal (for example, an RAR) in response to the beam recovery signal from the user terminal. This response signal may include configuration information about the beam set in which the new best beam is included (for example, at least one of CSI-RS resource configuration information, configuration information related to CSI reporting and/or L1-RSRP reporting, and resource configuration information).

To transmit this response signal, it is necessary to transmit scheduling information (DCI) of the response signal by using an NR-PDCCH (user terminal-specific search space). Meanwhile, in FIG. 7, it is not possible to use an NR-PDCCH due to a beam failure that has occurred.

So, an NR-PDCCH (also referred to as a "common search space (CSS)," and/or the like) for use for at least one of RAR, paging and system information blocks (SIBs) may be used to transmit the response signal's scheduling information (DCI). In this case, the scheduling information may be scrambled (masked) using an indicator (for example, a C-RNTI (Cell-Radio Network Temporary Identifier) that is specific to the user terminal).

Alternatively, a PDCCH that is used in common by a group of one or more user terminals (also referred to as a "UE group search space" and so on) may be used to transmit the scheduling information of the response signal. In this case, the scheduling information (also referred to as "group DCI," and/or the like) may be scrambled (masked) using an indicator that is common to these user terminals.

Also, when CSI-RS transmission and CSI reporting in inactive beams (for example, Tx beams B31 to B34 in FIG.

4) are activated by the response signal, information to command this activation may be included in a MAC control element (MAC CE) and transmitted in the response signal. Alternatively, this command information may be included in DCI that includes the above response signal's scheduling information.

(Radio Communication System)

Now, the structure of a radio communication system according to the present embodiment will be described below. In this radio communication system, communication is performed using one or a combination of the radio communication methods according to the herein-contained embodiments of the present invention.

Figure 8:
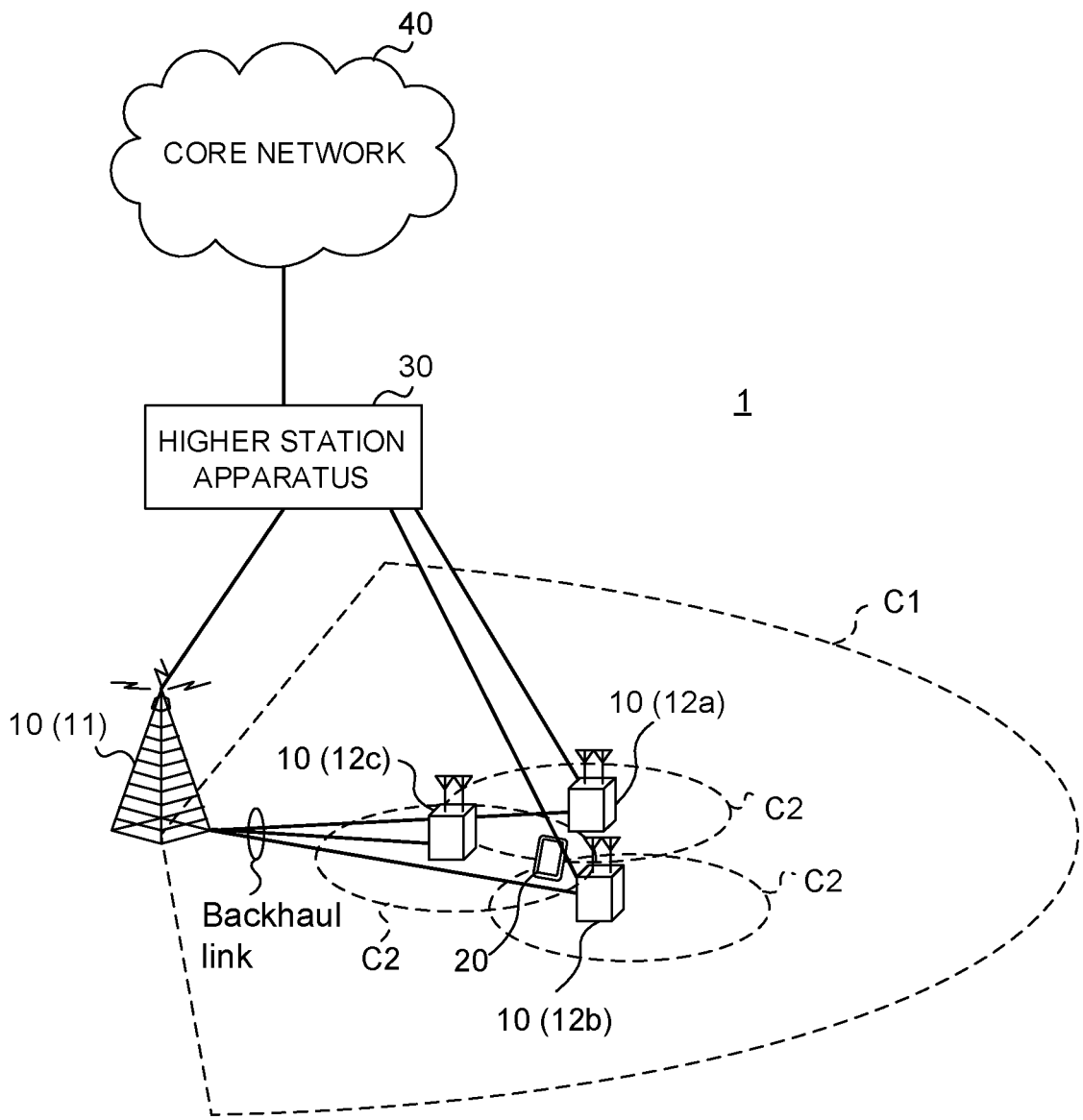
FIG. 8 is a diagram to show an exemplary schematic structure of a radio communication system according to the present embodiment.

FIG. 8 is a diagram to show an exemplary schematic structure of a radio communication system according to present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, with a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication is carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3 to 40 GHz) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a DL data channel (PDSCH (Physical Downlink Shared CHannel)), which is used by each user terminal 20 on a shared basis, a broadcast channel (PBCH (Physical Broadcast CHannel)), downlink L1/L2 control channels and so on are used as DL (DownLink) channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," and/or the like) in response to the PUSCH is transmitted by the PHICH. The EPDCCH is frequency-division-multiplexed with the PDSCH and used to communicate DCI and so on, like the PDCCH. The PDCCH and/or the EPDCCH are also referred to as "DL control channel," "NR-PDCCH," and the like.

In the radio communication system 1, an UL data channel (PUSCH (Physical Uplink Shared CHannel)), which is used by each user terminal 20 on a shared basis, an UL control channel (PUCCH (Physical Uplink Control CHannel)), a random access channel (PRACH (Physical Random Access CHannel)) and so on are used as UL (UpLink) channels. User data and higher layer control information are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication systems 1, the cell-specific reference signal (CRS), the channel state information reference signal (CSI-RS), the demodulation reference signal (DMRS), the positioning reference signal (PRS), the mobility reference signal (MRS) and so on are communicated as downlink reference signals. Also, in the radio communication system 1, the measurement reference signal (SRS (Sounding Reference Signal)), the demodulation reference signal (DMRS) and so on are communicated as UL reference signals. Note that the DMRS may be referred to as a "user terminal-specific reference signal (UE-specific Reference Signal)." Also, the reference signals to be communicated are by no means limited to these. In the radio communication system 1, synchronization signals (PSS and/or SSS), a broadcast channel (PBCH) and others are communicated in the downlink.

(Radio Base Station)

Figure 9:
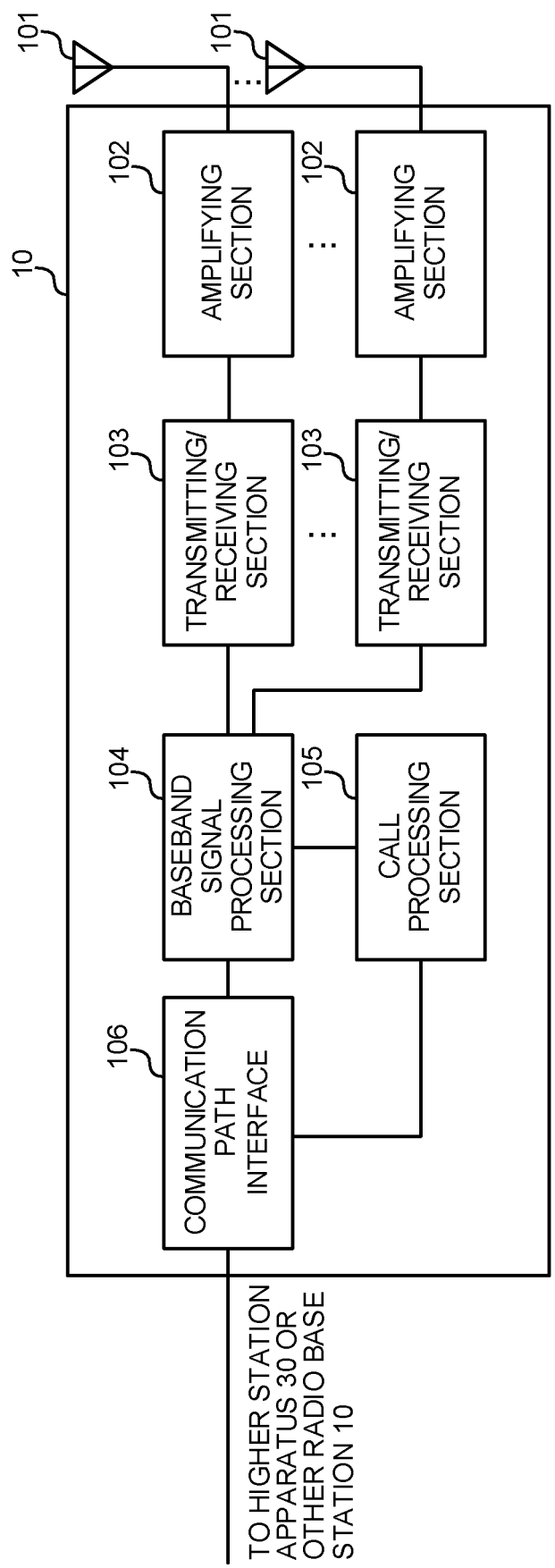
FIG. 9 is a diagram to show an exemplary overall structure of a radio base station according to the present embodiment.

FIG. 9 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas. In addition, the transmitting/receiving sections 103 are designed so that single-BF or multiple-BF operations can be used.

The transmitting/receiving sections 103 transmit DL signals (for example, at least one of NR-PDCCH/PDSCH, mobility measurement signals, CSI-RSs, DMRSs, DCI, and DL data) and receive UL signals (for example, at least one of PUCCH, PUSCH, beam recovery signals, measurement reports, beam reports, CSI reports, L1-RSRP reports, UCI and UL data).

In addition, the transmitting/receiving sections 103 transmit configuration information for L3 measurements and/or L1 measurements (for example, at least one of information to show the configurations of mobility measurement signals (for example, CSI-RSs and/or SS blocks), information to show the configurations of CSI-RS resources, and information to show the association between DMRS ports and CSI-RSs). Also, the transmitting/receiving sections 103 may transmit information to show the association (QCL) between CSI-RS resources for beam management and/or CSI measurements, and CSI-RS resources for mobility management, and/or information to show the association (QCL) between these CSI-RS resources for beam management and/or CSI measurements, and SS blocks for mobility management.

Also, the transmitting/receiving sections 103 may receive a PRACH preamble and transmit a RAR. Also, the transmitting/receiving sections 103 may receive an SR. Also, the transmitting/receiving sections 103 may receive UL signals transmitted from the radio base station 10 without DCI (UL grants).

Figure 10:
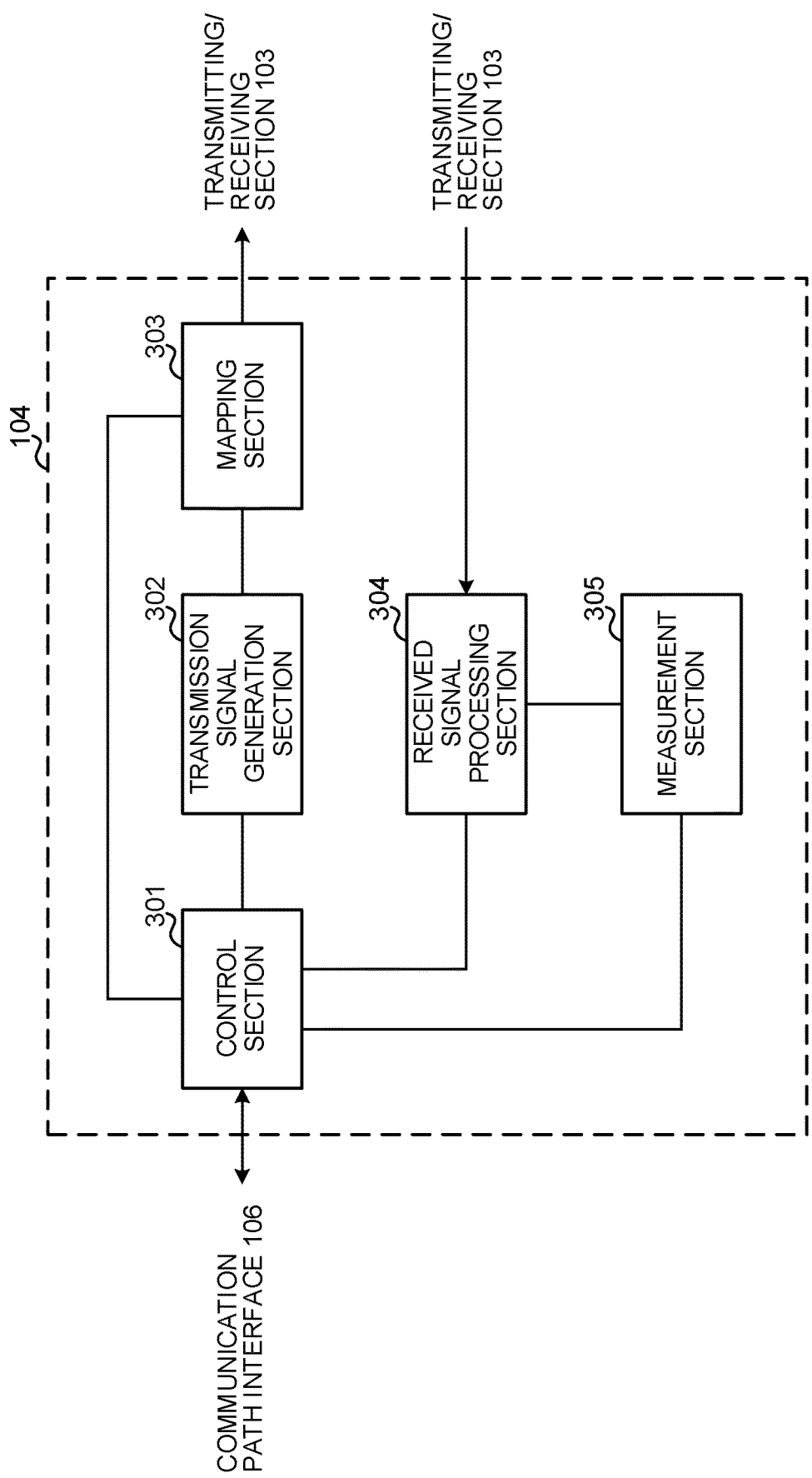
FIG. 10 is a diagram to show an exemplary functional structure of a radio base station according to the present embodiment.

FIG. 10 is a diagram to show an exemplary functional structure of a radio base station according to present embodiment. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls scheduling of DL data channels and UL data channels, and controls generation and transmission of DCI that schedules DL data channels (DL assignments) and DCI that schedules UL data channels (UL grants).

The control section 301 may exert control so that Tx beams and/or Rx beams are formed using digital BF (for example, precoding) by the baseband signal processing section 104 and/or analog BF (for example, phase rotation) by the transmitting/receiving sections 103.

The control section 301 controls the beams (Tx beams and/or Rx beams) that are used to transmit and/or receive DL signals (for example, the NR-PDCCH/PDSCH). To be more specific, the control section 301 may control these beams based on CSI (at least one of the CRI, the CQI, the PMI and the RI) from the user terminals 20.

The control section 301 may control the beams to use to transmit and/or receive a plurality of measurement signals (including mobility measurement signals and beam measurement signals, such as, for example, CSI-RSs and SS blocks).

Furthermore, the control section 301 may control beam recovery (switching) based on beam recovery signals from the user terminals 20. To be more specific, the control section 301 may identify the best beams of the user terminals 20 based on beam recovery signals, and control the re-configurations of beams (the re-configuration of CSI-RS resources, the re-configuration of QCL between DMRS ports and CSI-RS resources, and so on).

Furthermore, the control section 301 may exert control so that information about the configurations of re-configured beams (for example, information to represent the configurations of re-configured CSI-RS resources, and/or information to represent the QCL between DMRS ports and CSI-RS resources) is included in response signals to the recovery signals and transmitted.

In addition, the control section 301 may control the generation and/or transmission of scheduling information (DCI) of the response signals. This DCI may be transmitted using an NR-PDCCH (also referred to as a "common search space (CSS)") for use for at least one of RARs, paging and system information blocks (SIBs). In this case, this DCI may be scrambled (masked) using user terminal-specific indicators (for example, C-RNTIs).

The transmission signal generation section 302 generates DL signals based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

The transmission signal generation section 302 generates DCI (DL assignments, UL grants, etc.) based on commands from the control section 301, for example. Furthermore, a DL data channel (PDSCH) is subjected to an encoding process, a modulation process, a beamforming process (precoding process), based on coding rates, modulation schemes and others, which are determined based on, for example, CSI from each user terminal 20.

The mapping section 303 maps the DL signals generated in the transmission signal generation section 302 to radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals transmitted from the user terminals 20. For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when feedback information (for example, CSI, HARQ-ACK, etc.) arrives from the user terminal, this feedback information is output to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure, for example, the received power (for example, RSRP and/or RSSI), the received quality (for example, at least one of RSRQ, the signal-to-interference plus noise ratio (SINR) and the signal-to-noise ratio (SNR)), channel states and so forth of the received signals. The measurement results may be output to the control section 301.

(User Terminal)

Figure 11:
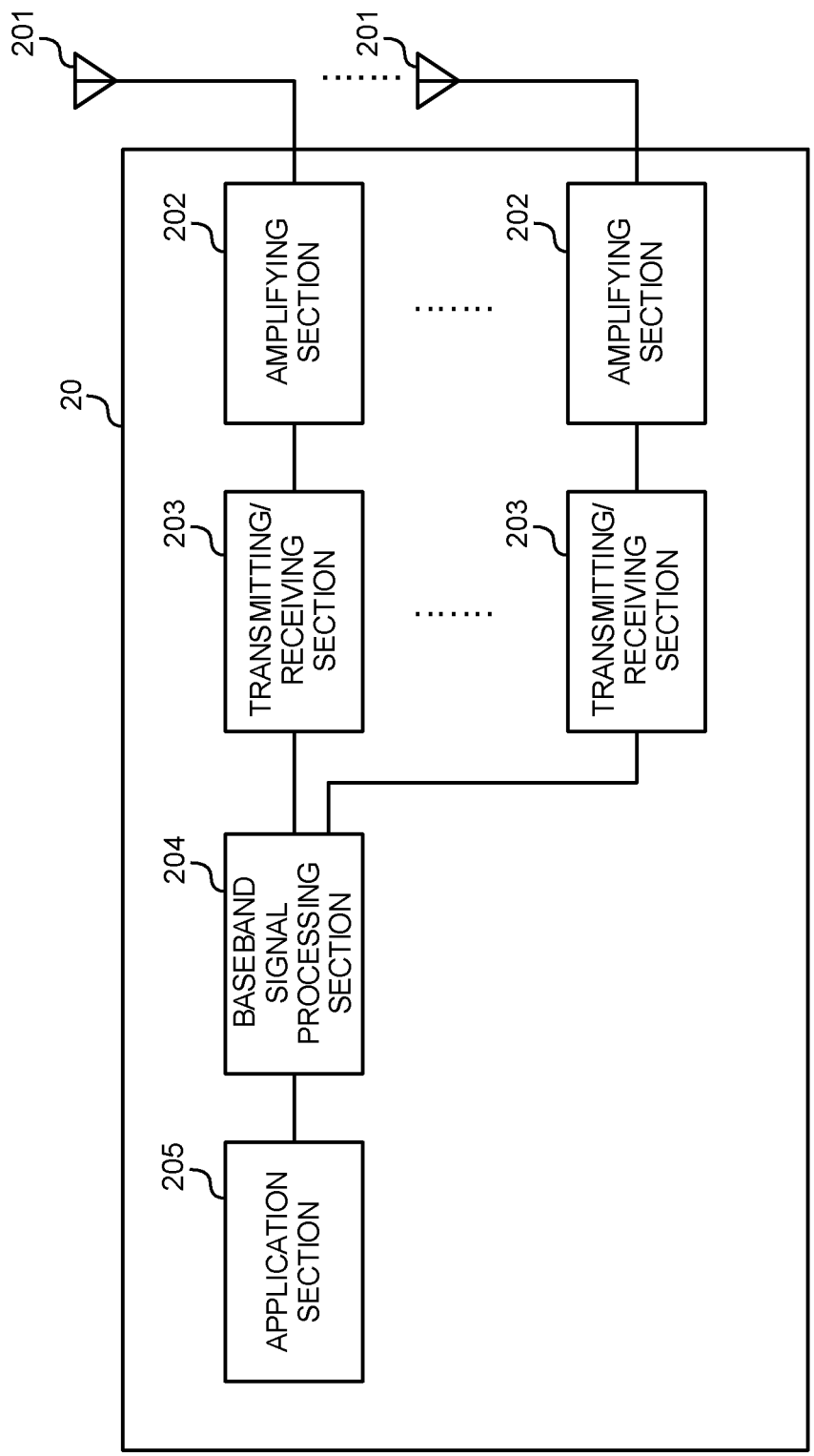
FIG. 11 is a diagram to show an exemplary overall structure of a user terminal according to the present embodiment.

FIG. 11 is a diagram to show an exemplary overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process and so on. Downlink user data is forwarded to the application section 205. The application section 205 performs processes related to higher layers above the physical layer and the MAC layer and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas. In addition, the transmitting/receiving sections 203 are structured so as to be capable of single-BF and multiple-BF operations.

The transmitting/receiving sections 203 receive DL signals (for example, at least one of the NR-PDCCH/PDSCH, mobility measurement signals, beam measurement signals, CSI-RSs, DMRSs, DCI, DL data and SS blocks) and transmit UL signals (for example, at least one of PUCCH, PUSCH, recovery signals, measurement reports, beam reports, CSI reports, UCI and UL data).

Also, the transmitting/receiving sections 203 receive configuration information for L3 measurements and/or L1 measurements (for example, at least one of information to show the configurations of mobility measurement signals (for example, CSI-RSs and/or SS blocks), information to show the configurations of CSI-RS resources, and information to show the association between DMRS ports and CSI-RSs). Also, the transmitting/receiving sections 203 may receive information to show the association (QCL) between CSI-RS resources for beam management and/or CSI measurements, and CSI-RS resources for mobility management, and/or information to show the association (QCL) between these CSI-RS resources for beam management and/or CSI measurements, and SS blocks for mobility management.

In addition, the transmitting/receiving sections 203 may transmit a PRACH preamble and receive a RAR. Also, the transmitting/receiving sections 203 may transmit an SR. In addition, the transmitting/receiving sections 203 may transmit UL signals without DCI (UL grants) from the radio base station 10.

Figure 12:
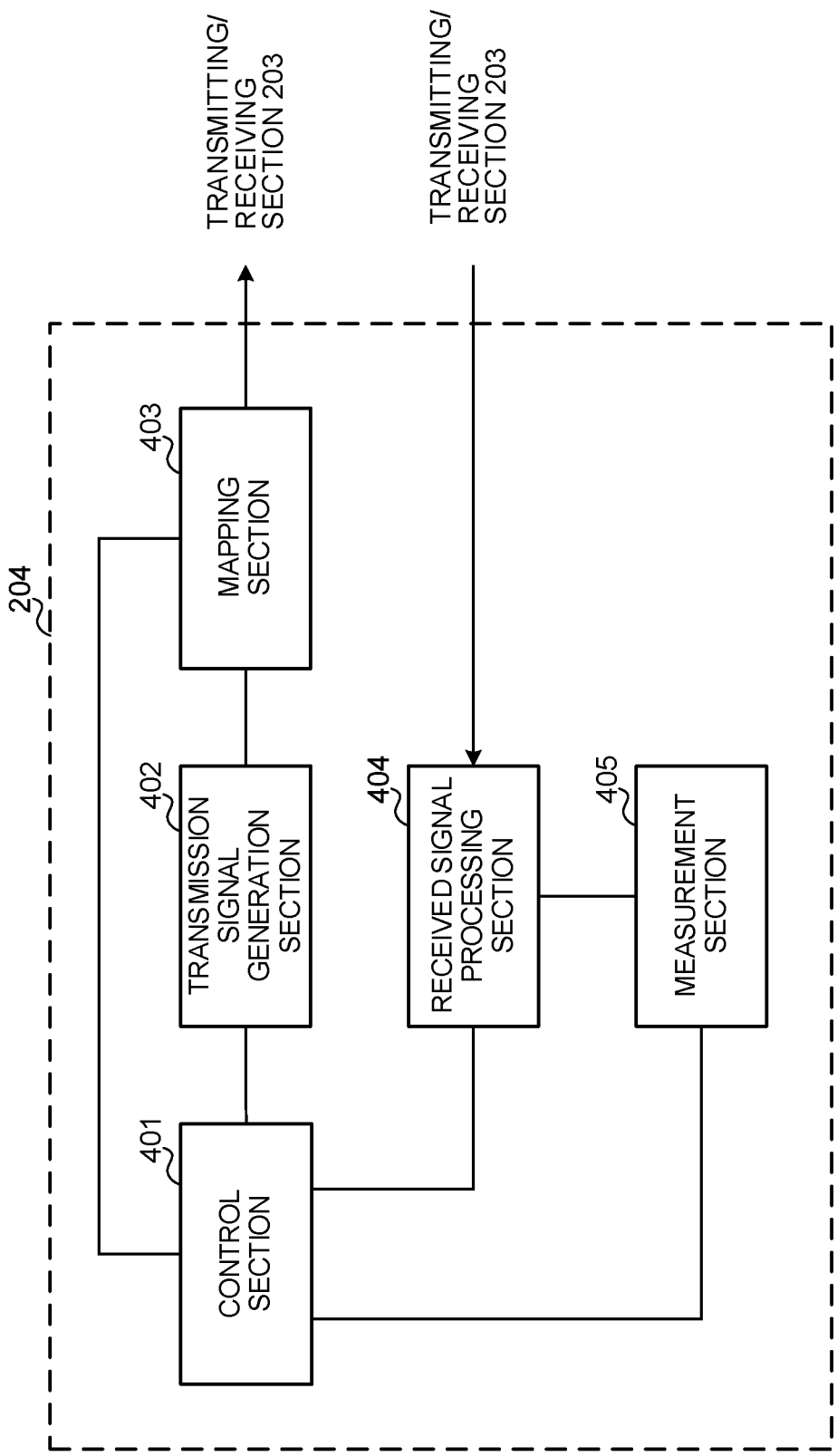
FIG. 12 is a diagram to show an exemplary functional structure of a user terminal according to the present embodiment.

FIG. 12 is a diagram to show an exemplary functional structure of a user terminal according to present embodiment. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires DL control signals (DL control channels) and DL data signals (DL data channels) transmitted from the radio base station 10 from the received signal processing section 404. The control section 401 controls generation of UL control signals (for example, delivery acknowledgement information and so on) and/or UL data signals based on whether or not retransmission control is necessary, which is decided in response to DL control signals, DL data signals and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203.

The control section 401 controls the beams (Tx beams and/or Rx beams) that are used to transmit and/or receive DL signals (for example, the NR-PDCCH/PDSCH).

Also, the control section 401 controls the transmission of signals (beam recovery signals) for requesting switching of beams (active beams) that are used to transmit and/or receive DL signals, based on received power that is measured based on one or more measurement signals (for example RSRP).

For example, the control section 401 controls the transmission of beam recovery signals based on L1-CSI-RSRP (first received power), which is measured based on CSI-RS resources that are associated with active beams, and a given threshold (step S101 of FIG. 5 and step S201 of FIG. 6).

In addition, the control section 401 controls the transmission of the above request signals based on L1-CSI-RSRP, which is measured based on CSI-RS resources that are associated with active beams, and L3-CSI-RSRP (second received power), which is measured based on CSI-RS resources that are associated with inactive beams (step S102 of FIG. 5).

In addition, the control section 401 controls the transmission of the above request signals based on L1/L3-SS-RSRP (third received power), which is measured based on SS blocks that are associated with active beams, and L1/L3-SS-RSRP (fourth received power), which is measured based on SS blocks that are associated with inactive beams (step S202 of FIG. 6).

This beam recovery signal may be one of a PRACH preamble, an SR and a UL grant-free UL signal. The UL grant-free UL signal may be transmitted in a UL resource.

In addition, the control section 401 may control the transmission of measurement reports based on results of L3 measurements using mobility measurement signals (for example, CSI-RSs and/or SS blocks). These measurement reports may each contain at least one of the beam ID (or information to show the beam ID), the RSRP and the RSRQ of a beam where the RSRP/RSRQ fulfills a given condition.

In addition, the control section 401 may control the transmission of CSI reports and/or L1-RSRP reports based on results of L1 measurements using beam measurement signals (for example, CSI-RSs and/or SS blocks). These CSI reports and/or L1-RSRP reports may be transmitted to the radio base station 10 using UL physical channels (for example, PUSCH and/or PUCCH).

Furthermore, the control section 401 may control the receiving process (demodulation and/or decoding) of DL signals based on information to show the QCL between DMRS ports and CSI-RS resources, provided from the radio base station 10. To be more specific, the control section 401 may assume that the same beams as the CSI-RS resources associated with the DMRS ports are used to transmit and/or receive DL signals.

Furthermore, the control section 401 may control the receiving process (demodulation and/or decoding) of response signals to beam recovery signals. For example, the control section 401 may assume that the beam that is used to transmit and/or receive a response signal (and/or the NR-PDCCH or the search space to schedule this response signal) is used to transmit and/or receive the mobility measurement reference signal of the best RSRP/RSRQ.

The transmission signal generation section 402 generates UL signals (UL control signals, UL data signals, UL reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

The transmission signal generation section 402 generates feedback information (for example, at least one of an HARQ-ACK, CSI and a scheduling request) based on, for example, command from the control section 401. Also, the transmission signal generation section 402 generates uplink data signals based on commands from the control section 401. For example, when a UL grant is included in a DL control signal that is reported from the radio base station 10, the control section 401 commands the transmission signal generation section 402 to generate an uplink data signal.

The mapping section 403 maps the UL signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, DL signals (DL control signals, DL data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using mobility measurement signals and/or CSI-RS resources transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP and/or RSSI), the received quality (for example at least one of RSRQ, SINR and SNR), channel states and so on, of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 13:
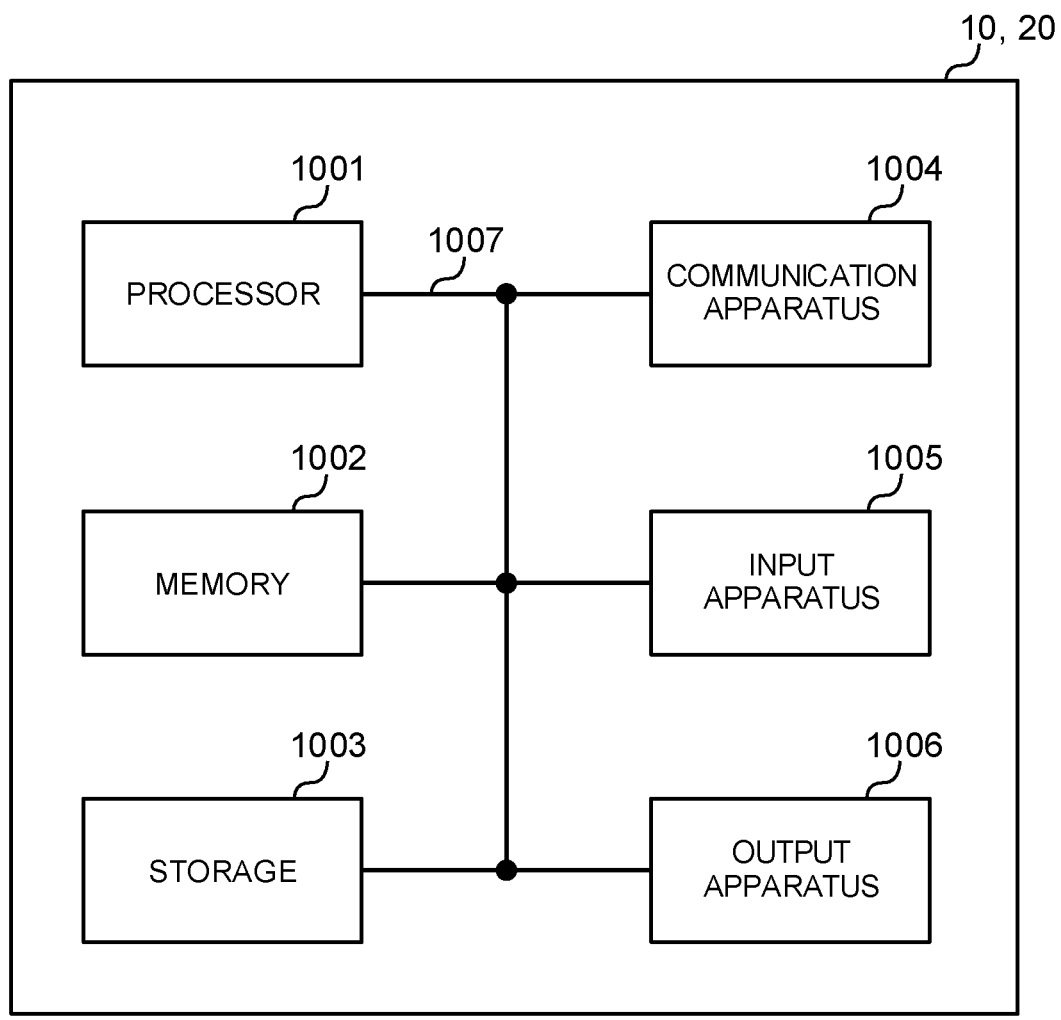
FIG. 13 is a diagram to show an exemplary hardware structure of a radio base station and a user terminal according to the present embodiment.

For example, the radio base station, user terminals and so on according to embodiments of the present invention may function as a computer that executes the processes of the radio communication method of the present invention. FIG. 13 is a diagram to show an exemplary hardware structure of a radio base station and a user terminal according to one embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval" (TTI), or a plurality of consecutive subframes may be referred to as a "TTI," or one slot or minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "minislot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "minislot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols, chips and so on, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a processor that, when a first L1-RSRP, which is measured using a channel state information reference signal (CSI-RS) resource associated with an active beam, is less than a given threshold value and the CSI-RS resource is quasi co-located (QCL) with a demodulation reference signal of a downlink control channel, determines whether to transmit a beam recovery request signal based on a second L1-RSRP, which is measured using a synchronous signal block associated with an inactive beam; and
a receiver that receives, in a search space for use of a random access response (RAR) for beam recovery, a physical downlink control channel (PDCCH) for a response signal to the beam recovery request signal, the PDCCH using a cell-radio network temporary identifier (C-RNTI).

2. The terminal according to claim 1, wherein the beam recovery request signal is a Physical Random Access Channel (PRACH) preamble.

3. The terminal according to claim 1, wherein the receiver receives the given threshold value using higher layer signaling.

4. A radio communication method comprising:
when a first L1-RSRP, which is measured using a channel state information reference signal (CSI-RS) resource associated with an active beam, is less than a given threshold value and the CSI-RS resource is quasi co-located (QCL) with a demodulation reference signal of a downlink control channel, of determining whether to transmit a beam recovery request signal based on a second L1-RSRP, which is measured using a synchronous signal block associated with an inactive beam; and
receiving, in a search space for use of a random access response (RAR) for beam recovery, a physical downlink control channel (PDCCH) for a response signal to the beam recovery request signal, the PDCCH using a cell-radio network temporary identifier (C-RNTI).

5. A system comprising a terminal and a base station, wherein:
the terminal comprises:
a processor that, when a first L1-RSRP, which is measured using a channel state information reference signal (CSI-RS) resource associated with an active beam, is less than a given threshold value and the CSI-RS resource is quasi co-located (QCL) with a demodulation reference signal of a downlink control channel, determines whether to transmit a beam recovery request signal based on a second L1-RSRP, which is measured using a synchronous signal block associated with an inactive beam; and
a receiver that receives, in a search space for use of a random access response (RAR) for beam recovery, a physical downlink control channel (PDCCH) for a response signal to the beam recovery request signal, the PDCCH using a cell-radio network temporary identifier (C-RNTI); and
the base station comprises:
a receiver that receives the beam recovery request signal.

* * * * *